United States Patent
Uluc et al.

(10) Patent No.: US 8,225,622 B2
(45) Date of Patent: Jul. 24, 2012

(54) COOLING SYSTEM AND FREIGHT CONTAINER

(75) Inventors: Ozan Uluc, Hamburg (DE); Kayihan Ahmet Kiryaman, Hamburg (DE); Matthias Witschke, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 732 days.

(21) Appl. No.: 12/296,350

(22) PCT Filed: Apr. 11, 2007

(86) PCT No.: PCT/EP2007/003218
§ 371 (c)(1),
(2), (4) Date: Mar. 19, 2009

(87) PCT Pub. No.: WO2007/115830

PCT Pub. Date: Oct. 18, 2007

(65) Prior Publication Data
US 2009/0193835 A1    Aug. 6, 2009

(30) Foreign Application Priority Data
Apr. 11, 2006  (DE) .................. 10 2006 017 012

(51) Int. Cl.
*B60H 1/32* (2006.01)
(52) U.S. Cl. .................. 62/244; 62/407
(58) Field of Classification Search .......... 62/244, 62/132, 407, 454; 220/1.5, 562; 454/76, 454/77
See application file for complete search history.

(56) References Cited

U.S. PATENT DOCUMENTS

| | | | |
|---|---|---|---|
| 3,507,322 A | | 4/1970 | Tetrick et al. |
| 4,262,495 A | * | 4/1981 | Gupta et al. .................. 62/402 |
| 4,901,538 A | * | 2/1990 | Anthony .................. 62/237 |
| 5,253,484 A | * | 10/1993 | Corman et al. .................. 62/239 |
| 5,322,244 A | * | 6/1994 | Dallmann et al. .......... 244/118.5 |
| 5,496,000 A | * | 3/1996 | Mueller .................. 244/118.1 |
| 5,513,500 A | * | 5/1996 | Fischer et al. .................. 62/239 |

(Continued)

FOREIGN PATENT DOCUMENTS
DE    19952524    5/2001

(Continued)

OTHER PUBLICATIONS

International Search Report, PCT/ISA/220, PCT/ISA/210, PCT/ISA/237.

(Continued)

*Primary Examiner* — Mohammad Ali
(74) *Attorney, Agent, or Firm* — Wood, Herron & Evans, LLP

(57) ABSTRACT

A system for cooling items of freight on board an aircraft includes a refrigerating device and also a cooling station to which cooling energy generated by the refrigerating device is supplied by a refrigerant medium. The cooling station is capable of being connected to a freight compartment of the aircraft or to a freight container on board the aircraft, in order to lead the cooling energy supplied to the cooling station away into the freight compartment or into the freight container. A freight container for receiving items of freight designated for transportation on board an aircraft is capable of being connected to a cooling station of a system for cooling items of freight on board an aircraft, so that the cooling energy supplied to the cooling station is capable of being led away into the freight container.

25 Claims, 4 Drawing Sheets

U.S. PATENT DOCUMENTS

| | | | | |
|---|---|---|---|---|
| 6,024,639 | A * | 2/2000 | Scherer et al. | 454/77 |
| 6,321,657 | B1 * | 11/2001 | Owen | 104/119 |
| 6,813,898 | B2 * | 11/2004 | Lindsay et al. | 62/228.4 |
| 6,860,114 | B2 * | 3/2005 | Jacobsen | 62/196.4 |
| 6,860,115 | B2 * | 3/2005 | Norelius et al. | 62/387 |
| 2003/0042361 | A1 | 3/2003 | Simadiris et al. | |
| 2004/0075021 | A1 * | 4/2004 | Drucker | 244/96 |
| 2005/0051668 | A1 * | 3/2005 | Atkey et al. | 244/118.5 |

FOREIGN PATENT DOCUMENTS

| | | |
|---|---|---|
| DE | 10361686 | 8/2005 |
| EP | 0577869 | 1/1994 |
| EP | 0655593 | 5/1995 |
| WO | 2005047784 | 5/2005 |
| WO | 2005052537 | 6/2005 |
| WO | 2005063567 | 7/2005 |

OTHER PUBLICATIONS

State Intellectual Property Office of People'S Republic of China, English language Translation of "Notification of the First Office Action," Application No. 200780012862.4, Apr. 21, 2011.

* cited by examiner

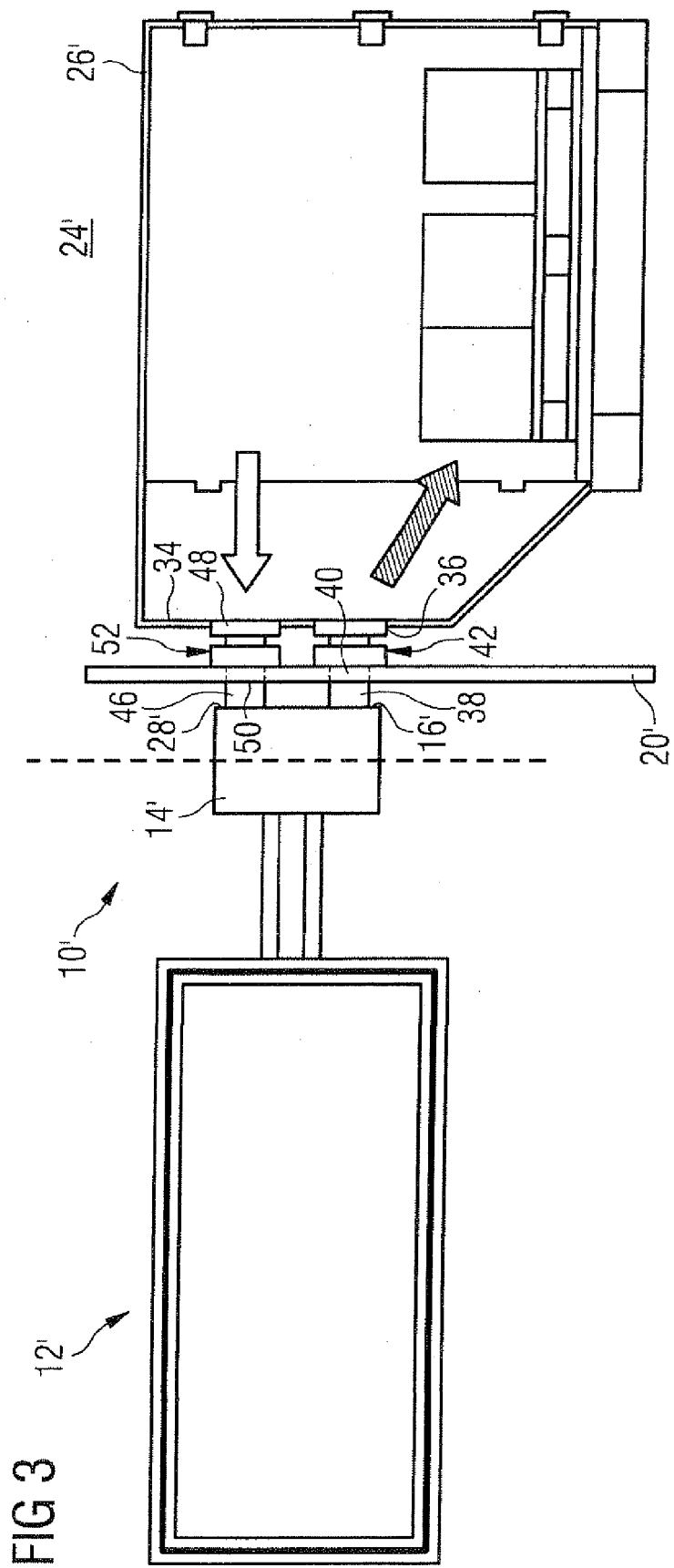

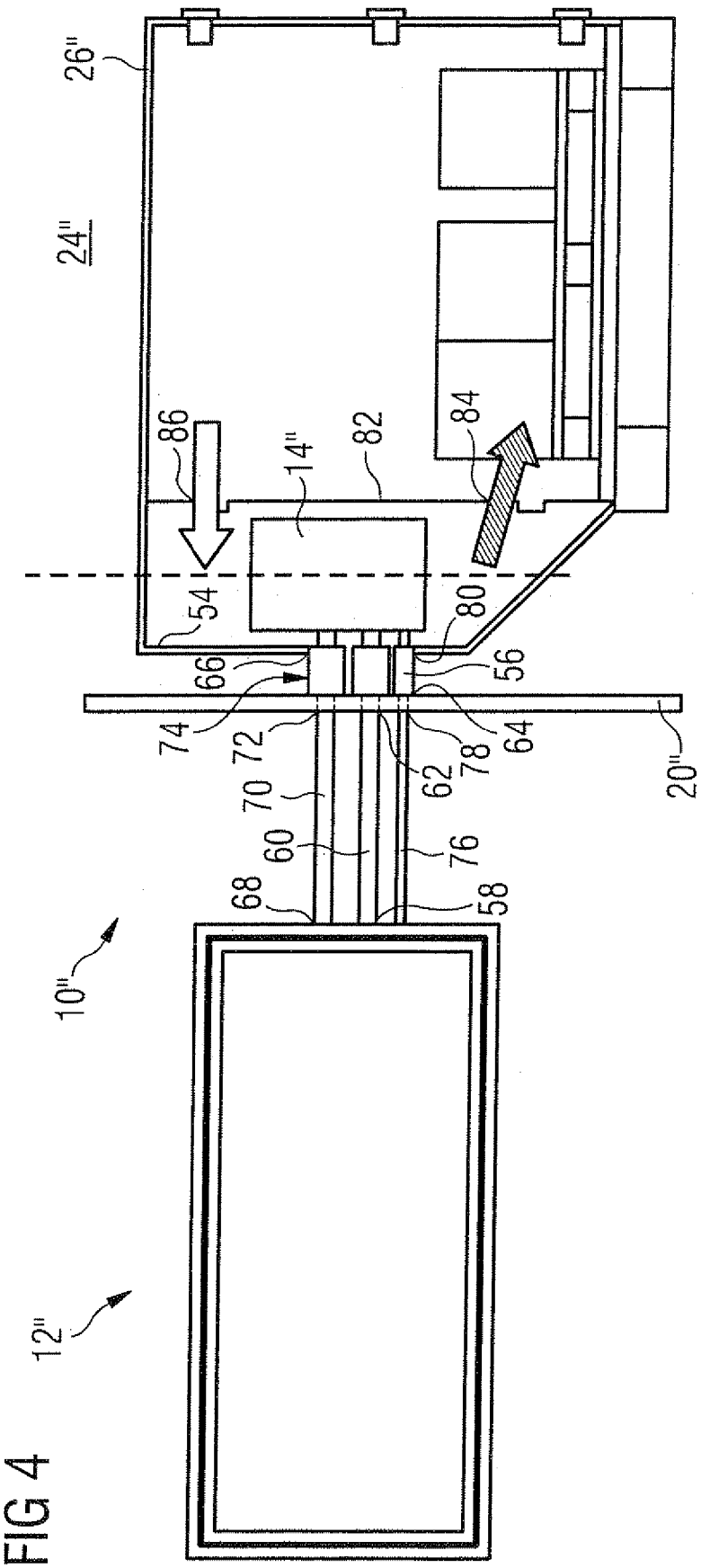

COOLING SYSTEM AND FREIGHT CONTAINER

This application claims the benefit of International Application No. PCT/EP2007/003218, filed on Apr. 11, 2007, and German Application No. DE 10 2006 017 012.1, filed on. Apr. 11, 2006.

TECHNICAL FIELD

The invention relates to a system for cooling items of freight on board an aircraft and also to a freight container, capable of being connected to the cooling system, for receiving items of freight designated for transportation on board an aircraft.

BACKGROUND

The transportation of items of freight by air is increasingly gaining in importance, in particular by reason of the very short transportation-times that are possible in this case. However, many items of freight also have to be cooled during transportation, in which connection an interruption of the cold-chain is in many cases not desired or permitted. In order to guarantee appropriate storage conditions for items of freight to be subjected to cold storage during transportation on board an aircraft, two different approaches are pursued at the present time.

A first approach consists in air-conditioning a freight compartment or freight-compartment zone, in which items of air freight to be subjected to cold storage are accommodated, with the aid of the air-conditioning unit of the aircraft. To this end, the freight compartment or freight-compartment zone to be cooled is connected to the air-conditioning unit of the aircraft via additional ports which are provided on the air-conditioning unit of the aircraft. Under certain conditions—for example, the presence of an appropriate ambient or external temperature, a stable cabin temperature and the presence of an additional floor insulation of the freight compartment—and also on the assumption that the cabin doors and freight-compartment doors are closed, temperatures within the range between +5° C. and +25° C. in the freight compartment or freight-compartment zone to be cooled can be adjusted with the aid of the air-conditioning unit of the aircraft.

In principle, an air-conditioning unit of an aircraft is provided with two independent climate-control systems. A first climate-control system of the air-conditioning unit of the aircraft serves for air-conditioning the aircraft cabin, whereas a second climate-control system of the air-conditioning unit of the aircraft can be optionally employed either for the purpose of assisting the first climate-control system for air-conditioning the aircraft cabin or for the purpose of air-conditioning the freight compartment or freight-compartment zone to be cooled. Since a higher priority is granted to the provisioning of the cabin than to the cooling of the freight compartment, the second climate-control system which is provided for the purpose of air-conditioning the freight compartment to be cooled is automatically utilised for the purpose of assisting the first climate-control system for air-conditioning the aircraft cabin if the cabin has a heightened cooling requirement.

An aircraft air-conditioning unit equipped with two independent climate-control systems is relatively complex and expensive. Furthermore, an aircraft air-conditioning unit of such a type has an increased weight and also an increased consumption of energy. Lastly, in the event of a heightened cooling requirement of the cabin, adequate air conditioning of the freight compartment can no longer be ensured in some circumstances, since the second climate-control system which is actually provided for the purpose of air-conditioning the freight compartment is automatically called upon for the purpose of assisting the first climate-control system for air-conditioning the aircraft cabin. A further disadvantage of the cooling of the freight compartment or freight-compartment zone with the aid of the air-conditioning unit of the aircraft consists in the fact that the air-conditioning unit of the aircraft has only a limited cooling capacity. Lastly, in the case of the cooling of the freight compartment or freight-compartment zone with the aid of the air-conditioning unit of the aircraft the entire freight compartment, or at least a relatively large freight-compartment zone, is cooled, so that items of freight that have to be transported at relatively high temperatures cannot be loaded into the same freight compartment or freight-compartment zone. As a consequence, in some circumstances the freight-transport capacity of the aircraft cannot be utilised optimally.

With a view to better utilisation of the freight-transport capacity of an aircraft it is therefore known to employ—in addition to, or as an alternative to, a cooling of the freight compartment or freight-compartment zone with the aid of the air-conditioning unit of the aircraft—cooled special containers for the transportation of items of freight to be subjected to cold storage. Special containers of such a type include a storage tank for receiving dry ice, and also a battery-operated fan. The fan serves, firstly, to convey air over the dry ice acting by way of heat-sink and, subsequently, to blow the cooled air over the items of freight to be cooled. The operation of the fan is controlled ordinarily with the aid of an electronic control unit. Depending on the load-state of the dry-ice storage tank, temperatures within the range between −20° C. and +20° C. can be adjusted in a cooled special container. An extension of this temperature range to a range between −20° C. and +30° C. is possible through the integration of an additional heating unit into the special container. However, the lowest temperature of −20° C. is attained in this case only in the unstable state—i.e. a constant cooling at −20° C. is not possible.

However, special containers of such a type, which are cooled with the aid of dry ice, exhibit the disadvantage that an elaborate consumption calculation—which is dependent on various factors such as, for example, the environmental conditions, the useful load and also the target temperature—for determining the quantity of dry ice to be additionally loaded into the storage tank is required prior to loading. Furthermore, by virtue of the requirement of having to add to the load up to 300 kg of dry ice, and also by reason of the weight of the further components that are required for the cooling of the container, the special container exhibits a higher empty weight and consequently a diminished loading capacity. Moreover, the service life is limited by reason of the limited storage capacity in respect of dry ice and also by reason of the limited battery capacity of the fan.

Further disadvantages arise directly through the use of dry ice by way of heat-sink. For example, by reason of the fact that no fully uniform distribution of the air over the items of freight is possible with the fan that is employed for distributing the cooled air, the cooling with dry ice results in an inhomogeneous temperature distribution in the container. Furthermore, dry ice releases $CO_2$ and therefore has to be declared as a hazardous material. As a consequence, regulations relating to the transportation of hazardous materials and also maximal loadings, which are ordinarily dependent on the type of aircraft, have to be adhered to in connection with the transportation of dry ice. Lastly, the transportation of certain items of freight together with dry ice is prohibited, or at least minimum distances between the items of freight and the dry ice have to be adhered to.

These approaches and/or other approaches are reflected in some of the prior art. For instance, DE 199 52 524 A1 discloses a device for supplying cooling air to a plurality of trolleys 7 disposed in a galley 1 on board a passenger aircraft. The device comprises an air chiller 3 connected to the galley 1 via a cooling circuit 15 so as to supply air cooled in the air chiller 3 to the trolleys 7 disposed in the galley 1.

EP 0 655 593 A1 describes a cooling system 1 for cooling food stored in trolleys 8a, 8b which are disposed in galleys 3a to 3e on board an aircraft. The system 1 comprises a refrigerating device 4 which supplies cooling fluid to heat exchangers 9a, 9b; 17a, 17b. The heat exchangers 9a, 9b; 17a, 17b serve to transfer cooling energy generated by the refrigerating device 4 to cooling air circulating in cooling air circuits 12a, 12b so as to cool the trolleys 8a, 8b in the galleys 3a to 3e.

US 2003/0042361 A1 relates to a system for cooling a galley on board an aircraft. The system comprises an air chiller 30 which is connected to a heat exchanger 26 disposed in a galley plenum 22 via an intermediate working fluid circuit 27. Lines 25 connect the galley plenum 22 with a galley cart 20 disposed in the galley. Cooling air which receives cooling energy from the heat exchanger 26 disposed in the galley plenum 22 is circulated from the galley plenum 22 to the galley cart 20 via the lines 25 by means of a blower 24.

U.S. Pat. No. 3,507,322 relates to an apparatus for handling perishable materials under controlled temperature conditions in storage and shipment. The apparatus comprises a primary heat exchanger 8 disposed in a primary heat exchanger circuit 7. The primary heat exchanger circuit 7 is in thermal contact with heat conductive piping, tubing or coil circuits 6 embedded in insulated casing 2 of portable containers 1 for storing the perishable materials. A liquid heat transfer medium as circulated through the piping, tubing or coil circuits 6 for transferring heat from the containers 1 to the primary heat exchanger circuit 7.

The object underlying the invention is to make available a cooling system and also a freight container capable of being connected to the cooling system, with which an energy-efficient and reliable cooling of items of freight on board an aircraft is possible.

SUMMARY OF THE INVENTION

With a view to achieving this object, a system for cooling items of freight on board an aircraft according to a first embodiment of the invention includes a refrigerating device and also a cooling station to which cooling energy generated by the refrigerating device is supplied by a refrigerant medium. The cooling station is capable of being connected to a freight compartment or a freight-compartment zone, which is optionally thermally insulated, of the aircraft, in order to lead the cooling energy supplied to the cooling station away into the freight compartment or freight-compartment zone.

The refrigerating device may, for example, be connected to the cooling station via a cooling circuit in which the refrigerant medium is circulated with the aid of a conveying device such as a pump, for example. $CO_2$, R134A ($CH_2F—CF_3$) or Galden® HAT 135, obtainable from Solvay Solexis, may be employed, for example, by way of refrigerant medium. The cooling station preferentially takes the form of an air-cooling device with a heat-exchanger, to which air-cooling device air to be cooled is supplied via an air inlet. The air that is supplied to the cooling station is then cooled to the desired low temperature in the heat-exchanger as a consequence of the thermal contact with the refrigerant medium which has been conveyed through the heat-exchanger, and leaves the cooling station through an air outlet. The system according to the invention for cooling items of freight on board an aircraft may include only one cooling station, but, when required, it may also include several cooling stations that are capable of being connected to the freight compartment or to a freight-compartment zone, which is optionally thermally insulated, of the aircraft, in order to lead the cooling energy supplied to the cooling station away into the freight compartment or freight-compartment zone.

In principle, the system according to the invention for cooling items of freight on board an aircraft may be constructed separately from further cooling systems which are present on board the aircraft. However, the system according to the invention is preferentially integrated into a central cooling system of the aircraft. The refrigerating device is then constituted by a central refrigerating device which is arranged, for example, in the underfloor region of the aircraft and which is connected to a plurality of cooling stations via a cooling circuit. Cooling stations of the central cooling system that do not serve for cooling the freight compartment of the aircraft may, for example, be provided for the purpose of providing food containers arranged in the region of the galleys with cold air and/or for the purpose of supplying cooling energy to electronic components of an avionics system.

The individual cooling stations of the central cooling system are preferentially arranged in the vicinity of their sites of use. A cooling station for cooling food containers may accordingly be arranged in the vicinity of a galley, a cooling station for cooling the electronic components of the avionics systems may be arranged beneath the cockpit, and a cooling station for cooling the freight compartment of the aircraft may be arranged in the vicinity of the freight compartment, for example in the lateral triangular regions of the aircraft.

By virtue of the system according to the invention, a reliable and energy-efficient cooling of items of freight to be subjected to cold storage in a freight compartment or in an optionally thermally insulated freight-compartment zone is guaranteed. The air-conditioning unit of the aircraft is no longer needed for the purpose of air-conditioning the freight compartment, and as a result its load is greatly relieved.

Furthermore, the system according to the invention may be designed in relatively straightforward manner in such a way that temperatures in the freight compartment of the aircraft can be adjusted which lie within a range that is clearly extended in comparison with the temperature range to be adjusted with the aid of the air-conditioning unit of the aircraft.

The system according to the invention for cooling items of freight can be controlled and monitored relatively easily and without great additional effort in particular when the system is integrated into a central cooling system of an aircraft. For example, in the cooling circuit between the refrigerating device and the cooling station that is capable of being connected to the freight compartment of the aircraft, or between the cooling station and the freight compartment, an electronically selectable valve may be arranged which in the open state enables the supply of cooling energy into the freight compartment and which in the closed state interrupts said supply. Furthermore, data—for example, temperature data—from the freight compartment of the aircraft can be fed into the network of the central cooling system and can consequently be monitored in straightforward manner from the cockpit or from the cabin.

The cooling station of the system according to the invention for cooling items of freight on board an aircraft preferentially exhibits an air outlet that is capable of being connected to an air inlet provided in a freight-compartment fairing. For the purpose of connecting the air outlet of the cooling station to the air inlet provided in the freight-compartment fairing, a connecting line, for example, may be provided which is formed in integrated manner with the cooling station and is connected in sealing manner to the air inlet formed in the freight-compartment fairing. As an alternative, the connecting line may also be fastened detachably to the cooling station and connected in sealing manner to the air outlet of the cooling station.

The cooling station of the system according to the invention for cooling items of freight on board an aircraft further preferentially exhibits an air inlet that is capable of being connected to an air outlet provided in the freight-compartment fairing. As a result, the cold air that has been supplied to the freight compartment from the cooling station can be circulated—i.e. the cold air that has been heated as a result of the thermal contact with the items of freight to be cooled can be conducted back again into the cooling station and cooled again there to the desired low temperature, for example in a heat-exchanger, as a result of thermal contact with the refrigerant medium.

For the purpose of connecting the air inlet of the cooling station to the air outlet provided in the freight-compartment fairing, a further connecting line may be provided which is formed in integrated manner with the cooling station and is connected in sealing manner to the air outlet formed in the freight-compartment fairing. As an alternative, the further connecting line may also be fastened detachably to the cooling station and connected in sealing manner to the air inlet of the cooling station.

According to a second embodiment of the invention, a system for cooling items of freight on board an aircraft includes a refrigerating device and also a cooling station to which cooling energy generated by the refrigerating device is supplied by means of a refrigerant medium, the cooling station being capable of being connected to a freight container on board the aircraft, in order to lead the cooling energy supplied to the cooling station away into the freight container. As distinct from the first embodiment, described above, of a system for cooling items of freight on board an aircraft, a system of such a type enables the selective cooling of individual freight containers arranged in the freight compartment of an aircraft. Moreover, the refrigerating device and also the cooling station of the cooling system may be constructed as described above in connection with the first embodiment of the invention.

The cooling station of the system according to the invention for cooling items of freight on board an aircraft preferentially exhibits an air outlet that is capable of being connected to an air inlet provided in a freight-container wall. The cooling station of the cooling system can consequently be connected in straightforward manner to the freight container, in order to supply cold air generated by the cooling station to the freight container.

For the purpose of connecting the air outlet of the cooling station to the air inlet provided in the freight-container wall, a first coupling element is preferentially provided. The first coupling element may, for example, have been passed through a first linkage aperture formed in a freight-compartment fairing. With the aid of the first coupling element, the air outlet of the cooling station can be connected particularly easily to the air inlet formed in the freight-container wall if the freight container has been positioned at the corresponding position in the freight compartment of the aircraft.

The first coupling element may include a first sealing element for sealing connection of the first coupling element to the air outlet of the cooling station. As an alternative, however, the first coupling element may also be formed in integrated manner with the cooling station in such a manner that the first sealing element can be dispensed with. Furthermore, the first coupling element may include a second sealing element for sealing connection of the first coupling element to the air inlet provided in the freight-container wall. By virtue of a first coupling element formed in such a manner, it is ensured that the cold air generated by the cooling station can be conducted away into the freight container without appreciable losses.

The cooling station of the system according to the invention for cooling items of freight on board an aircraft preferentially exhibits an air inlet. By virtue of the air inlet, air which is cooled to the desired low temperature in the cooling station as a result of thermal contact with the refrigerant medium is supplied to the cooling station. The air inlet of the cooling station may be connected to the surrounding atmosphere, so that air can be supplied to the cooling station of the cooling system from the surrounding atmosphere. As an alternative, however, the air inlet of the cooling station may also be capable of being connected to an air outlet provided in the freight-container wall. As a result, cold air generated by the cooling station can be circulated—i.e. cold air that has been supplied through the air inlet in the freight-container wall and that has been heated as a result of the thermal contact with the items of freight to be cooled can be conducted back to the cooling station for renewed cooling through the air outlet provided in the freight-container wall.

For the purpose of connecting the air inlet of the cooling station to the air outlet provided in the freight-container wall, a second coupling element is preferentially provided which enables a rapid and easy connection of the air inlet of the cooling station to the air outlet formed in the freight-container wall. The second coupling element may have been passed through a second linkage aperture formed in the freight-compartment fairing.

The second coupling element may include a first sealing element for sealing connection of the second coupling element to the air inlet of the cooling station. As an is alternative, however, the second coupling element may also be formed in integrated manner with the cooling station in such a manner that the first sealing element can be dispensed with. Furthermore, the second coupling element may include a second sealing element for sealing connection of the second coupling element to the air outlet provided in the freight-container wall.

A freight container according to the invention for receiving items of freight designated for transportation on board an aircraft is capable of being connected to a cooling station of a system for cooling items of freight on board an aircraft. As elucidated above, the system for cooling items of freight on board an aircraft includes a refrigerating device and also a cooling station to which cooling energy generated by the refrigerating device is supplied by means of a refrigerant medium. By virtue of the connection of the freight container according to the invention to the cooling station of the cooling system, the cooling energy supplied to the cooling station by the refrigerating device is capable of being led directly away into the freight container. The freight container according to the invention enables a reliable and energy-efficient cooling of items of freight stored in the freight container.

In comparison with cooled freight containers known from the state of the art, the freight container according to the invention exhibits a number of advantages. Since dry ice is no longer required for the purpose of cooling the container, the freight container according to the invention has a diminished empty weight and therefore an increased loading capacity. Furthermore, the disadvantages, described above, arising in connection with the use of dry ice for cooling items of freight stored in a freight container can be avoided.

The freight container preferentially exhibits an air inlet provided in a freight-container wall, said air inlet being capable of being connected to an air outlet of the cooling station. The freight container can consequently be linked rapidly and easily to the cooling station of the cooling system and can be supplied with cooling energy generated by the cooling station.

Furthermore, the freight container may exhibit an air outlet provided in the freight-container wall, said air outlet being capable of being connected to an air inlet of the cooling station. Cold air generated by the cooling station can, after the heating thereof as a result of the thermal contact with the items of freight stored in the freight container, then be conducted back to the air inlet of the cooling station and can be cooled again to the desired low temperature in the cooling station.

A third embodiment of a system according to the invention for cooling items of freight on board an aircraft includes a refrigerating device that is capable of being connected to a cooling station, in order to supply cooling energy generated by the refrigerating device to the cooling station by means of a refrigerant medium. The refrigerating device and the cooling station may in this case be constructed as elucidated above in connection with the first embodiment of the cooling system according to the invention. The third embodiment of the cooling system according to the invention is distinguished in that the cooling station is integrated into a freight container for receiving items of freight designated for transportation on board an aircraft and is set up to lead the cooling energy supplied to the cooling station away into the freight container. By virtue of the integration of the cooling station into the freight container to be cooled, the installation space for the cooling station on board the aircraft can be utilised in some other way. Furthermore, the assembly and also the maintenance of a cooling station integrated into a freight container are simpler and more cost-effective than the assembly and maintenance of a cooling station installed permanently on board the aircraft.

In the third embodiment of the system according to the invention for cooling items of freight on board an aircraft the refrigerating device of the system preferentially exhibits a refrigerant-medium outlet that is capable of being connected to a refrigerant-medium inlet provided in a freight-container wall. The cooling station integrated into the freight container can consequently be linked rapidly and easily to a cooling circuit connected to the refrigerating device.

For the purpose of connecting the refrigerant-medium outlet of the refrigerating device to the refrigerant-medium inlet provided in the freight-container wall, a first connecting element may be provided. The connecting element may have been passed through a first connecting aperture formed in a freight-compartment fairing.

The first connecting element may include a first sealing element for sealing connection of the first connecting element to the refrigerant-medium outlet of the refrigerating device. As an alternative, however, the first connecting element may also be formed in integrated manner with the refrigerating device of the cooling system according to the invention and/or may form a portion of a cooling circuit connected to the refrigerating device, to which further cooling stations of a central cooling system of the aircraft may be linked. Furthermore, the first connecting element may be provided with a second sealing element for sealing connection of the first connecting element to the refrigerant-medium inlet provided in the freight-container wall.

The refrigerating device of the system according to the invention for cooling items of freight on board an aircraft may further exhibit a refrigerant-medium inlet that is capable of being connected to a refrigerant-medium outlet provided in the freight-container wall. Refrigerant medium that has been cooled to a low temperature by the refrigerating device and that has been heated in the cooling station integrated into the freight container—for example, in a heat-exchanger by release of its cooling energy to the air flowing through the cooling station—can consequently be conducted back into the refrigerating device and cooled again there to the desired low temperature.

For the purpose of connecting the refrigerant-medium inlet of the refrigerating device to the refrigerant-medium outlet provided in the freight-container wall, a second connecting element may be provided which enables a rapid and easy connection of the refrigerant-medium inlet of the refrigerating device to the refrigerant-medium outlet in the freight-container wall. The second connecting element has preferentially been passed through a second connecting aperture formed in a freight-compartment fairing.

The second connecting element may include a first sealing element for sealing connection of the second connecting element to the refrigerant-medium inlet of the refrigerating device. As an alternative, however, the second connecting element may also be formed in integrated manner with the refrigerating device and/or may form a portion of a cooling circuit connected to the refrigerating device, to which further cooling stations of a central cooling system of the aircraft may be linked. Furthermore, the second connecting element may include a second sealing element for sealing connection of the second connecting element to the refrigerant-medium outlet provided in the freight-container wall.

The cooling system according to the invention preferentially exhibits an electrical linkage element for the purpose of electrical connection of the cooling station integrated into the freight container, said linkage element having been passed through a third connecting aperture formed in the freight-compartment fairing. The electrical linkage element permits the cooling station integrated into the freight container to be supplied with electrical energy in straightforward manner via the power-supply system of a central cooling system or via the on-board power-supply system of the aircraft as soon as the freight container is located in its designated position on board the aircraft.

A second embodiment of a freight container according to the invention for receiving items of freight for transportation on board an aircraft includes a cooling station integrated into the freight container. This cooling station is capable of being connected to a refrigerating device of a system for cooling items of freight on board an aircraft, in order to supply cooling energy generated by the refrigerating device to the cooling station by means of a refrigerant medium. The cooling energy supplied to the cooling station is capable of being led away into the freight container and can consequently be used for the purpose of cooling items of freight stored in the freight container.

The freight container preferentially exhibits a refrigerant-medium inlet provided in a freight-container wall, said refrigerant-medium inlet being capable of being connected to a refrigerant-medium outlet of the refrigerating device. The cooling station integrated into the freight container can consequently be integrated in straightforward manner into a cooling circuit via which the cooling energy generated by the refrigerating device can be transferred, by means of the refrigerant medium, to the cooling station integrated into the freight container.

The freight container further exhibits a refrigerant-medium outlet provided in the freight-container wall, said refrigerant-medium outlet being capable of being connected to a refrigerant-medium inlet of the refrigerating device. As a result, the refrigerant medium that has been cooled by the refrigerating device to the desired low temperature and that has been heated on passing through a heat-exchanger in the cooling station, by release of its cooling energy, can be conducted back to the refrigerating device and cooled again there to the desired low temperature.

The freight container according to the invention further exhibits an electrical connector provided in a freight-container wall, which for the purpose of electrical connection of the cooling station integrated into the freight container is capable of being connected to the electrical linkage element of the cooling system.

BRIEF DESCRIPTION OF THE DRAWINGS

Preferred exemplary embodiments of the invention will now be elucidated in greater detail on the basis of the appended schematic drawings, in which:

FIG. 3 shows a modification of the second embodiment, represented in FIG. 2, of a system for cooling items of freight on board an aircraft and also a modification of the first embodiment, represented in FIG. 2, of an associated freight container for receiving the items of freight, and FIG. 4 shows a third embodiment of a system for cooling items of freight on board an aircraft and also an associated second embodiment of a freight container according to the invention for receiving the items of freight.

DETAILED DESCRIPTION

Figure 1:
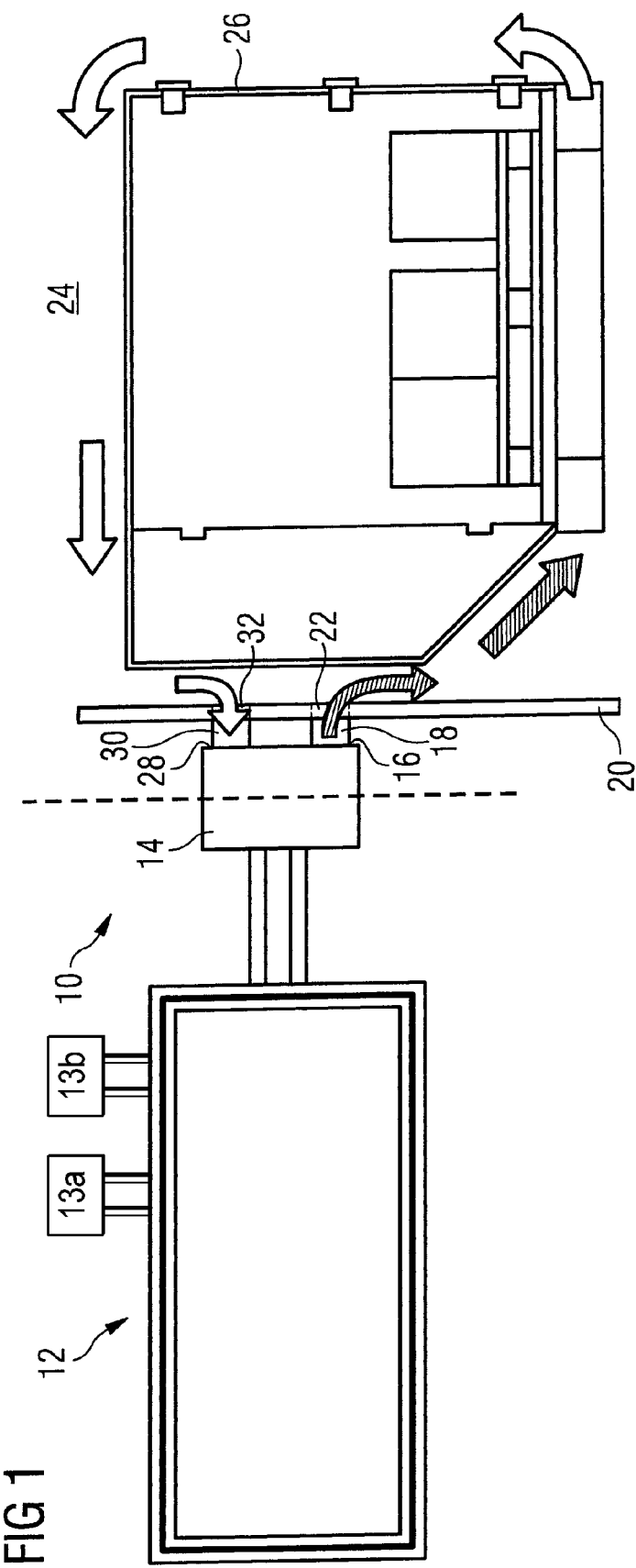
FIG. 1 shows a first embodiment of a system according to the invention for cooling items of freight on board an aircraft.

A first embodiment of a system 10 for cooling items of freight on board an aircraft is shown in FIG. 1. The system 10 is integrated into a central cooling system 12 of the aircraft, which includes a refrigerating device and also a plurality of cooling stations. The cooling stations of the central cooling system are connected to the refrigerating device via a cooling circuit in which Galden.RTM. HAT 135, obtainable from Solvay Solexis, by way of refrigerant medium is circulated by a pump. Via the refrigerant medium the cooling energy generated by the refrigerating device is supplied to the individual cooling stations. In the cooling circuit, electronically selectable valves are arranged upstream of each cooling station, which in the closed state prevent the supply of refrigerant medium, and consequently cooling energy, to the respective cooling station, and in the open state permit the supply of refrigerant medium, and consequently cooling energy, to the respective cooling station.

Some cooling stations of the central cooling system of the aircraft serve for cooling food containers arranged in the region of the galleys of the aircraft (e.g., first cooling station 13a), or supply cooling energy to electronic components of an avionics system (e.g., second cooling station 13b). The cooling stations 13a employed for cooling the food containers are installed in the region of the galleys, whereas the cooling station or cooling stations 13b for cooling the avionics system are arranged in a region beneath the cockpit.

Each cooling station takes the form of an air-cooling unit and includes a heat-exchanger in which the refrigerant medium that has been cooled to a low temperature by the refrigerating device is brought into thermal contact with air supplied into the cooling station. As a result of the thermal contact with the refrigerant medium, the air is cooled, so that each cooling station releases cooling energy in the form of cold air.

A third cooling station 14, installed in a freight-compartment region in the lateral triangular regions of the aircraft, of the system 10 integrated into the central cooling system 12 of the aircraft for cooling items of freight on board an aircraft exhibits an air outlet 16 which via a connecting line 18 is connected to an air inlet 22 provided in a freight-compartment fairing 20. Air that has been cooled in the cooling station can consequently be supplied into a freight compartment 24 or into an optionally thermally insulated freight-compartment zone of the aircraft and can serve there for cooling items of freight stored in a freight container 26 or in several freight containers.

The cooling station 14 further exhibits an air inlet 28 for supplying air to be cooled in the cooling station 14 into the cooling station 14. The air inlet 28 of the cooling station is connected via a further connecting line 30 to an air outlet 32 provided in the freight-compartment fairing 20. Cold air supplied from the cooling station 14 into the freight compartment 24, which is heated in the freight compartment 24 as a result of thermal contact with the items of freight to be cooled, can consequently be conducted back into the cooling station 14 via the air outlet 32 formed in the freight-compartment fairing 20 and via the air inlet 28 and can be cooled again there to the desired low temperature.

Figure 2:
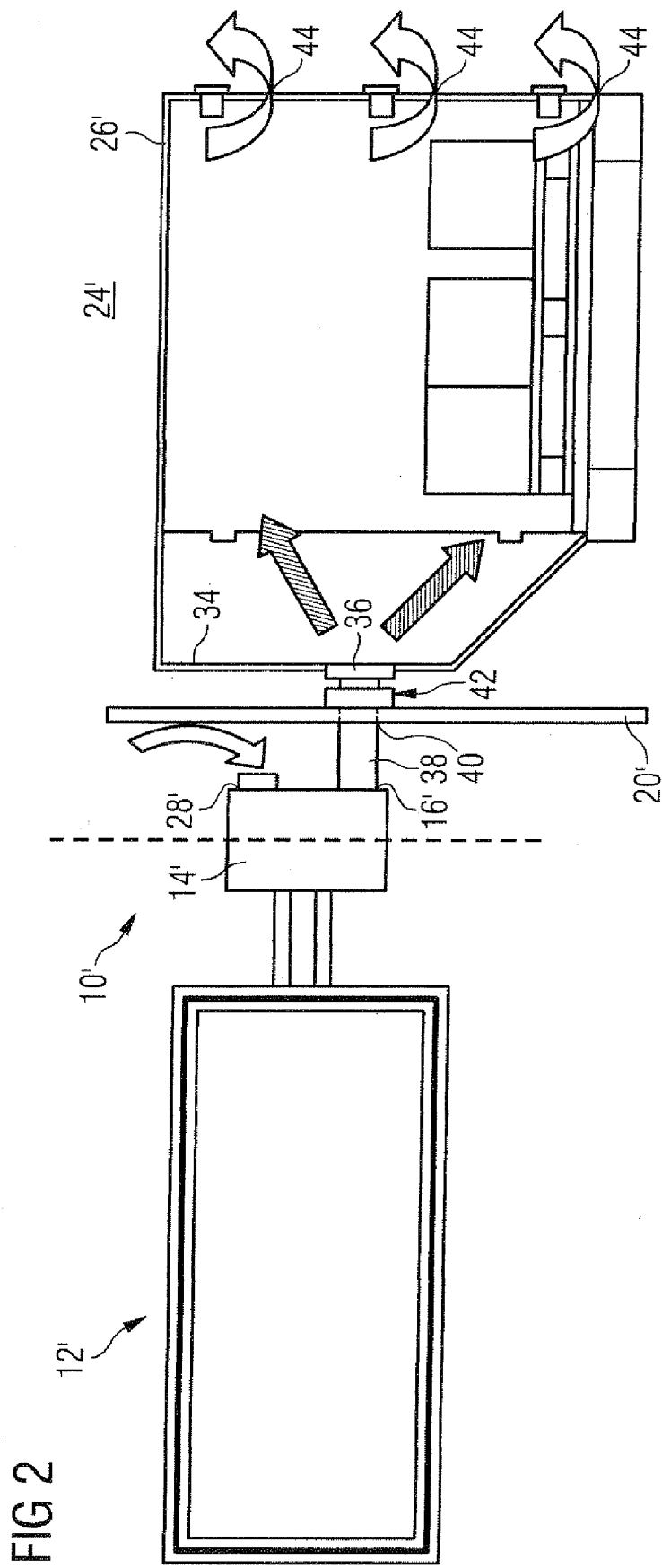
FIG. 2 shows a second embodiment of a system according to the invention for cooling items of freight on board an aircraft and also a first embodiment of an associated freight container for receiving the items of freight.

FIG. 2 shows a second embodiment of a system 10' for cooling items of freight on board an aircraft. The system 10' for cooling items of freight on board an aircraft is, like the system 10 represented in FIG. 1, integrated into a central cooling system 12' of the aircraft with a refrigerating device and also with a plurality of cooling stations to which cooling energy generated by the refrigerating device is supplied by a refrigerant medium which is circulated in a cooling circuit by a pump. A cooling station 14' of the system 101 for cooling items of freight on board an aircraft is, as in the case of the system 10 shown in FIG. 1, installed in a freight-compartment region in the lateral triangular regions of the aircraft.

As distinct from the system 10 represented in FIG. 1, however, in the case of the system 10' shown in FIG. 2 for cooling items of freight on board an aircraft an air outlet 16' of the cooling station 14' is directly connected to an air inlet 36 provided in a freight-container wall 34. For the purpose of connecting the air outlet 16' of the cooling station 14' to the air inlet 36 provided in the freight-container wall 34, use is made of a first coupling element 38 formed in integrated manner with the cooling station 14'. The first coupling element 38 extends from the air outlet 16' of the cooling station 14 through a first linkage aperture 40 provided in a freight-compartment fairing 20' and is detachably connected to the air inlet 36 provided in the freight-container wall 34. For the purpose of sealing connection of the first coupling element 38 to the air inlet 36 provided in the freight-container wall 34, the first coupling element 38 exhibits a sealing element 42 of bipartite construction.

The freight container 26' with the items of freight to be subjected to cold storage arranged therein can consequently be connected in straightforward manner to the cooling station 14' of the cooling system 10' by means of the first coupling element 38 as soon as it is arranged in its designated position in the freight compartment 24' of the aircraft. As a result, cold air generated by the cooling station 14' can be blown into the freight container 26' directly and can be used there for the purpose of cooling the items of freight stored in the freight container 26'. The freight container 26' further exhibits ventilating apertures 44, via which the air blown into the freight container 26' from the cooling station 14' can be led away again out of the freight container 26' into the freight compartment 24' of the aircraft.

The supply of the cooling station 14' with air to be cooled to the desired low temperature is effected via an air inlet 28'. Air is supplied to the air inlet 28' of the cooling station 14' from the surrounding atmosphere of the cooling station 14'.

The system 10' shown in FIG. 3 for cooling items of freight on board an aircraft differs from the system 10' represented in FIG. 2 merely in that the air inlet 28' of the cooling station 14' is connected to an air outlet 48 provided in the freight-container wall 34 via a second coupling element 46. Like the first coupling element 38, the second coupling element 46 is also formed in integrated manner with the cooling station 14' and extends from the air inlet 28' of the cooling station 14' through a second linkage aperture 50 formed in the freight-compartment fairing 20', in order to be detachably connected to the air outlet 48 formed in the freight-container wall 34. Just like the first coupling element 38, the second coupling element 46 also includes a sealing element 52 of bipartite construction which serves for sealing connection of the second coupling element 46 to the air outlet 48 formed in the freight-container wall 34.

In the case of the cooling station 10' shown in FIG. 3, the cold air generated by the cooling station 14" which has been heated as a result of thermal contact with the items of freight to be cooled in the freight container 26', can be led away again out of the freight container 26' through the air outlet 48 formed in the freight-container wall 34 and conducted back to the cooling station 14' via the second coupling element 46. The air entering the air inlet 28' of the cooling station 141 can then be cooled again to the desired low temperature in the cooling station 14'.

A third embodiment of a system 10" for cooling items of freight on board an aircraft is shown in FIG. 4. The system 10" for cooling items of freight on board an aircraft is once again integrated into a central cooling system 12" of the aircraft. The central cooling system 12" of the aircraft includes a refrigerating device which is connected to a plurality of cooling stations via a cooling circuit, in order to supply cooling energy generated by the refrigerating device to the cooling stations by means of a refrigerant medium which is circulated in the cooling circuit by a pump.

As distinct from the systems 10, 10' discussed above, however, the cooling station 14" of the system 10" shown in FIG. 4 for cooling items of freight on board an aircraft is not permanently installed in the region of a freight compartment 24" of the aircraft but is integrated into a freight container 26" for receiving items of air freight to be subjected to cold storage.

For the purpose of linking the cooling station 14" of the system 10" for cooling items of freight on board an aircraft to the cooling circuit of the central cooling system 12", a refrigerant-medium inlet 56 is therefore provided in a wall 54 of the freight container 26", said refrigerant-medium inlet being connected to a refrigerant-medium outlet 58 of the refrigerating device of the central cooling system 12". For the purpose of connecting the refrigerant-medium outlet 58 of the refrigerating device of the central cooling system 12" to the refrigerant-medium inlet 56 formed in the freight-container wall 54, a first connecting element 60 is present which extends through a first connecting aperture 62 formed in a freight-compartment fairing 20" and is detachably connected to the refrigerant-medium inlet 56 formed in the freight-container wall 54. The first connecting element 60 exhibits a sealing element 64 of bipartite construction for sealing connection of the first connecting element 60 to the refrigerant-medium inlet 56 provided in the freight-container wall 54.

Furthermore, in the freight-container wall 54 a refrigerant-medium outlet 66 is formed which is connected to a refrigerant-medium inlet 68 of the refrigerating device of the central cooling system 12". In order to connect the refrigerant-medium inlet 68 of the refrigerating device of the central cooling system 12" detachably to the refrigerant-medium outlet 66 provided in the freight-container wall 54, a second connecting element 70 is provided which extends through a second connecting aperture 72 formed in the freight-compartment fairing 20".

Just like the first connecting element 60, the second connecting element 70 also exhibits a sealing element 74 of bipartite construction for sealing connection of the second connecting element 70 to the refrigerant-medium outlet 66 formed in the freight-container wall 54.

For the purpose of electrical connection of the cooling station 14" integrated into the freight container 26" to an electrical supply network of the central cooling system 12", an electrical linkage element 76 is present which has been passed through a third connecting aperture 78 formed in the freight-compartment fairing 20". The electrical linkage element 76 is provided for the purpose of detachable connection to an electrical connector 80 which is formed in the freight-container wall 54 and electrically connected to the cooling station 14".

The cooling station 14" is arranged in a region of the freight container 26" which is separated by a partition 82 from a region of the freight container 26" in which the items of air freight to be transported are received. Formed in the partition 82 are air inlets 84, through which the cold air generated by the cooling station 14" can be supplied to the items of freight to be cooled. By virtue of air outlets 86 formed in the partition 82, air that has been heated as a result of the thermal contact with the items of freight can be supplied again to the cooling station 14".

The invention claimed is:

1. An aircraft cooling system comprising:
a central refrigerating device, and
a plurality of air cooling stations to which cooling energy generated by the central refrigerating device is supplied by a refrigerant medium circulating through a cooling circuit, the plurality of air cooling stations including:
a first cooling station for supplying air cooled by cooling energy transfer in the first air cooling station to a food container arranged in the region of an aircraft galley,
a second air cooling station for supplying air cooled by cooling energy transfer in the second air cooling station to electronic components of the aircraft, and
a third air cooling station connected to a freight compartment of the aircraft, in order to supply air cooled by cooling energy transfer in the third air cooling station into the freight compartment.

2. The cooling system according to claim 1, wherein the third air cooling station exhibits an air outlet which is capable of being connected to an air inlet provided in a freight-compartment fairing.

3. The cooling system according to claim 1, wherein the third air cooling station exhibits an air inlet which is capable of being connected to an air outlet provided in a freight-compartment fairing.

4. An aircraft cooling system comprising:
a central refrigerating device, and
a plurality of air cooling stations to which cooling energy generated by the central refrigerating device is supplied by a refrigerant medium circulating through a cooling circuit, the plurality of air cooling stations including:
a first air cooling station for supplying air cooled by cooling energy transfer in the first air cooling station to a food container arranged in the region of an aircraft galley,
a second air cooling station for supplying air cooled by cooling energy transfer in the second air cooling station to electronic components of the aircraft, and
a third air cooling station including means for connecting the third air cooling station to a freight container disposed in a freight compartment of the aircraft, in order to supply air cooled by cooling energy transfer in the third air cooling station into the freight container.

5. The cooling system according to claim 4, wherein the third air cooling station exhibits an air outlet which is capable of being connected to an air inlet provided in a freight-container wall.

6. The cooling system according to claim 5, wherein for the purpose of connecting the air outlet of the third air cooling station to the air inlet in the freight-container wall, a first coupling element is provided which has been passed through a first linkage aperture formed in a freight-compartment fairing.

7. The cooling system according to claim 6, wherein the first coupling element includes a first sealing element for sealing connection of the first coupling element to the air outlet of the third air cooling station and/or includes a second sealing element for sealing connection of the first coupling element to the air inlet provided in the freight-container wall.

8. The cooling system according to claim 4, wherein the third air cooling station exhibits an air inlet which is capable of being connected to an air outlet provided in the freight-container wall.

9. The cooling system according to claim 8, wherein for the purpose of connecting the air inlet of the third air cooling station to the air outlet in the freight-container wall, a second coupling element is provided which has been passed through a second linkage aperture formed in the freight-compartment fairing.

10. The cooling system according to claim 9, wherein the second coupling element includes a first sealing element for sealing connection of the second coupling element to the air inlet of the third air cooling station and/or includes a second sealing element for sealing connection of the second coupling element to the air outlet provided in the freight-container wall.

11. An aircraft freight container for receiving items of freight designated for transportation in a freight compartment of an aircraft, comprising means for connecting the freight container to a third air cooling station of an aircraft cooling system according to claim 4 when the freight container is disposed in the freight compartment of the aircraft, in order to supply air cooled by cooling energy transfer in the third air cooling station into the freight container.

12. The freight container according to claim 11, wherein the freight container exhibits an air inlet provided in a freight-container wall, the air inlet being capable of being connected to an air outlet of the third air cooling station.

13. The freight container according to claim 11, wherein the freight container exhibits an air outlet provided in the freight-container wall, the air outlet being capable of being connected to an air inlet of the third air cooling station.

14. An aircraft cooling system comprising:
a central refrigerating device, and
a plurality of cooling stations to which cooling energy generated by the central refrigerating device is supplied by a refrigerant medium circulating through a cooling circuit, the plurality of cooling stations including:
a first air cooling station for supplying air cooled by cooling energy transfer in the first air cooling station to a food container arranged in the region of an aircraft galley,
a second air cooling station for supplying air cooled by cooling energy transfer in the second air cooling station to electronic components of the aircraft, and
a third air cooling station connected by a means to the central refrigerating device, in order to supply cooling energy generated by the central refrigerating device to the third air cooling station by a refrigerant medium, wherein the third air cooling station is integrated into an aircraft freight container for receiving items of freight designated for transportation in a freight compartment of the aircraft, in order to supply air cooled by cooling energy transfer in the air cooling station into the freight container, when the freight container is disposed in the freight compartment of the aircraft.

15. The cooling system according to claim 14, wherein the refrigerating device exhibits a refrigerant-medium outlet which is capable of being connected to a refrigerant-medium inlet provided in a freight-container wall.

16. The cooling system according to claim 15, wherein for the purpose of connecting the refrigerant-medium outlet of the refrigerating device to the refrigerant-medium inlet in the freight-container wall, a first connecting element is provided which has been passed through a first connecting aperture formed in a freight-compartment fairing.

17. The cooling system according to claim 16, wherein the first connecting element includes a first sealing element for sealing connection of the first connecting element to the refrigerant-medium outlet of the refrigerating device and/or includes a second sealing element for sealing connection of the first connecting element to the refrigerant-medium inlet provided in the freight-container wall.

18. The cooling system according to claim 14, wherein the refrigerating device exhibits a refrigerant-medium inlet which is capable of being connected to a refrigerant-medium outlet provided in the freight-container wall.

19. The cooling system according to claim 18, wherein for the purpose of connecting the refrigerant-medium inlet of the refrigerating device to the refrigerant-medium outlet in the freight-container wall, a second connecting element is provided which has been passed through a second connecting aperture formed in the freight-compartment fairing.

20. The cooling system according to claim 19, wherein the second connecting element includes a first sealing element for sealing connection of the second connecting element to the refrigerant-medium inlet of the refrigerating device and/or includes a second sealing element for sealing connection of the second connecting element to the refrigerant-medium outlet provided in the freight-container wall.

21. The cooling system according to claim 14, wherein for the purpose of electrical connection of the air cooling station integrated into the freight container, an electrical linkage element is provided which has been passed through a third connecting aperture formed in the freight-compartment fairing.

22. An aircraft freight container (26″) for receiving items of freight designated for transportation in a freight compartment (24″) of an aircraft, comprising a third air cooling station integrated into the freight container and including means for connecting the third air cooling station to a central refrigerating device of an aircraft cooling system according to claim 14 when the freight container is disposed in the freight compartment of the aircraft, in order to supply air cooled by cooling energy transfer in the third air cooling station into the freight container.

23. The freight container according to claim 22, wherein the freight container exhibits a refrigerating-medium inlet provided in a freight-container wall, the refrigerating-medium inlet being capable of being connected to a refrigerant-medium outlet of the refrigerating device.

24. The freight container according to claim 22, wherein the freight container exhibits a refrigerating-medium outlet provided in the freight-container wall, the refrigerant-medium outlet being capable of being connected to a refrigerant-medium inlet of the refrigerating device.

25. The freight container according to claim 22, wherein the freight container exhibits an electrical connector provided in the freight-container wall, the electrical connector being capable of being connected to an electrical linkage element for the purpose of electrical connection of the third air cooling station integrated into the freight container.

* * * * *